United States Patent Office 3,583,974
Patented June 8, 1971

3,583,974
HEXOSE AND HEPTOSE PHOSPHONATES, PHOSPHONIC ACIDS, PHOSPHONIC ACID SALTS AND DERIVATIVES THEREOF
Gordon H. Jones, Palo Alto, and John G. Moffatt, Los Altos, Calif., assignors to Syntex Corporation, Panama, Panama
No Drawing. Continuation-in-part of application Ser. No. 643,078, June 2, 1967. This application Apr. 1, 1969, Ser. No. 812,451
Int. Cl. C07c 69/32
U.S. Cl. 260—234
14 Claims

ABSTRACT OF THE DISCLOSURE

The 5,6-dideoxy-D-hexose 6-phosphonates, 6,7-dideoxy-D-heptose 7-phosphonates, the corresponding 6- and 7-phosphonic acids, and their pharmaceutically acceptable salts are valuable pharmacological agents. For example, they are useful in regulating and controlling metabolism and for producing metabolic deficiencies in biological systems. These compounds and derivatives thereof such as the corresponding 1-O-acyl compounds and glycosyl halides are also useful for preparing the corresponding nucleotide analogs which have similar utilities.

This is a continuation-in-part of application Ser. No. 643,078 filed June 2, 1967, now Pat. No. 3,524,846.

This invention relates to 5,6-dideoxy-D-hexose 6-phosphonates, 6,7-dideoxy-D-heptose 7-phosphonates, the corresponding phosphonic acids, and their pharmaceutically acceptable salts; it also relates to 1-O-acyl-5,6-dideoxy-D-hexofuranose 6-phosphonates and 5,6-dideoxy-D-hexofuranosyl halide 6-phosphonates, and to 1-O-acyl-6,7-dideoxy-D-heptopyranose 7-phosphonates and 6,7-dideoxy-D-heptopyranosyl halide 7-phosphonates.

The 5,6-dideoxy-D-hexose 6-phosphonates, 6,7-dideoxy-D-heptose 7-phosphonates, the corresponding phosphonic acids and their pharmaceutically acceptable salts can be represented by the following general formulas:

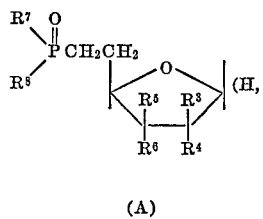
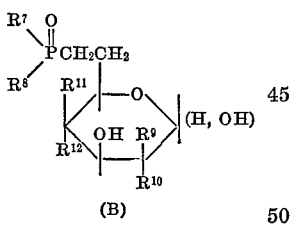

In the above formulas, $R^3$, $R^4$, $R^5$ and $R^6$ are hydrogen or hydroxy but only as follows:
  where $R^4$ and $R^6$ are hydroxy, and $R^3$ and $R^5$ are hydrogen;
  when $R^4$ and $R^5$ are hydroxy, and $R^3$ and $R^6$ are hydrogen;
  when $R^3$ and $R^5$ are hydroxy, and $R^4$ and $R^6$ are hydrogen;
  when $R^3$ and $R^6$ are hydroxy, and $R^4$ and $R^5$ are hydrogen; and
  when $R^6$ is hydroxy and $R^3$, $R^4$ and $R^5$ are hydrogen;
each of $R^7$ and $R^8$ are —OM, lower alkoxy, aryloxy or substituted aryloxy, lower alkenylmethoxy having unsaturation at a position other than alpha, but not including benzyloxy or substituted benzyloxy wherein M is hydrogen or a pharmaceutically acceptable cation;

$R^9$, $R^{10}$, $R^{11}$ and $R^{12}$ are hydrogen or hydroxy but only as follows:
  when $R^{10}$ and $R^{11}$ are hydroxy and $R^9$ and $R^{12}$ are hydrogen;
  when $R^{10}$ and $R^{12}$ are hydroxy and $R^9$ and $R^{11}$ are hydrogen; and
  when $R^9$ and $R^{12}$ are hydroxy and $R^{10}$ and $R^{11}$ are hydrogen.

The 1-O-acyl-5,6-dideoxy-D-hexofuranose 6-phosphonates, 5,6-dideoxy-D-hexofuranosyl halide 6-phosphonates, 1-O-acyl-6,7-dideoxy-D-heptopyranose 7-phosphonates and 6,7-dideoxy-D-heptopyranosyl halide 7-phosphonates of this invention can be represented by the following general formulas:

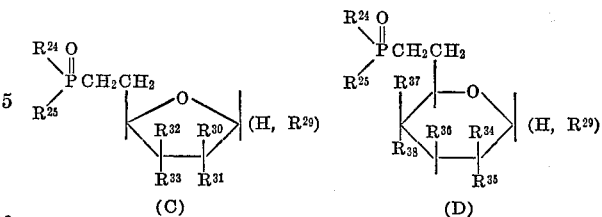

In the above formulas:

$R^{24}$ and $R^{25}$ are lower alkoxy, lower alkenylmethoxy but not including α-unsaturated alkenylmethoxy, or aryloxy or substituted aryloxy but not including benzyloxy or substituted benzyloxy;
$R^{29}$ is bromo, chloro or a lower aliphatic acyloxy such as formyloxy, acetyloxy, n-propionyloxy, n-butyryloxy, isobutyryloxy, valeryloxy, isovaleryloxy and the like, preferably acetyloxy;
$R^{30}$ and $R^{34}$ each are hydrogen, benzyloxy or substituted benzyloxy; $R^{31}$, $R^{35}$ and $R^{37}$ each are hydrogen or lower aliphatic acyloxy; $R^{32}$, $R^{33}$ and $R^{38}$ each are hydrogen, benzyloxy, substituted benzyloxy or lower aliphatic acyloxy; and $R^{36}$ is benzyloxy, substituted benzyloxy or lower aliphatic acyloxy but only as follows:
  when $R^{31}$ and $R^{33}$ are lower aliphatic acyloxy, and $R^{30}$ and $R^{32}$ are hydrogen;
  when $R^{31}$ and $R^{32}$ are lower aliphatic acyloxy, and $R^{30}$ and $R^{33}$ are hydrogen;
  when $R^{30}$ and $R^{32}$ are benzyloxy or substituted benzyloxy, and $R^{31}$ and $R^{33}$ are hydrogen;
  when $R^{30}$ and $R^{33}$ are benzyloxy or substituted benzyloxy, and $R^{31}$ and $R^{32}$ are hydrogen;
  when $R^{33}$ is benzyloxy, substituted benzyloxy or lower aliphatic acyloxy, and $R^{30}$, $R^{31}$ and $R^{32}$ are hydrogen;
  when $R^{35}$, $R^{36}$ and $R^{37}$ are lower aliphatic acyloxy, and $R^{34}$ and $R^{38}$ are hydrogen;
  when $R^{35}$, $R^{36}$ and $R^{38}$ are lower aliphatic acyloxy, and $R^{34}$ and $R^{37}$ are hydrogen; and
  when $R^{34}$, $R^{36}$ and $R^{38}$ are benzoyloxy or substituted benzyloxy, and $R^{35}$ and $R^{37}$ are hydrogen.

The 5,6-dideoxy-D-hexose 6-phosphonates, the corresponding 6-phosphonic acids and their salts include several equilibrium forms because of mutarotation which can be represented by Formula I and I' as follows. All of the equivalent equilibrium forms are intended to be represented by Formula I

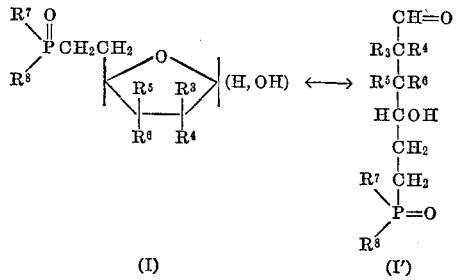

In the above formulas $R^3$, $R^4$, $R^5$, $R^6$, $R^7$ and $R^8$ are as previously defined.

The 6,7-dideoxy-D-heptose 7-phosphonates, their esters and salts also have several equilibrium forms because of mutarotation, the pyranose forms of Formula II, the furanoses of Formula IIa (derived from glucose and mannose) and IIb (derived from galactose) and the intermediate aldehydes of Formula II'. Formula II is intended to cover all of these equivalent equilibrium forms.

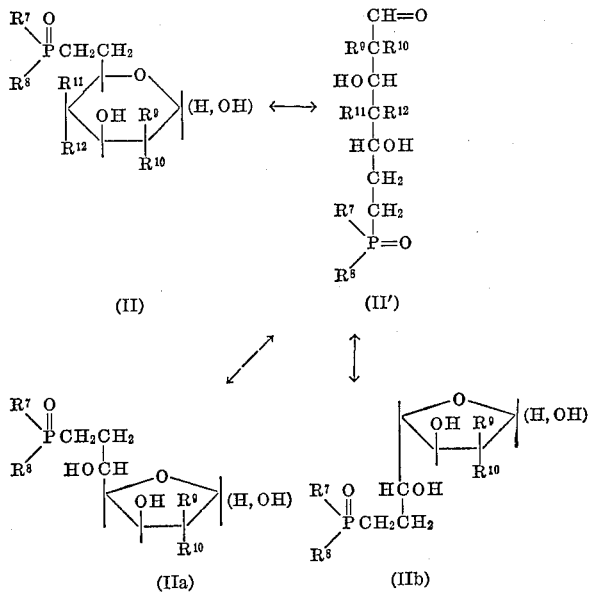

(II)   (II')

(IIa)   (IIb)

In the above formula $R^7$, $R^8$, $R^9$, $R^{10}$, $R^{11}$ and $R^{12}$ are as previously defined.

The following representation at the 1-position:

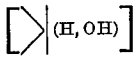

is defined as descriptive of compounds having α-hydroxy, β-hydrogen, and α-hydrogen, β-hydroxy configurations at the 1-position. Because of mutarotation, both equilibrium forms occur. Similar representations wherein OH is replaced by another symbol have the corresponding meaning wherein the represented group is at the α-position of one isomeric form and at the β-position in another isomeric form.

The term "pharmaceutically acceptable cations," as used herein, refers to cations of those pharmaceutically acceptable salts conventionally employed in the pentose 5-phosphate and hexose 6-phosphate art such as barium, calcium, sodium, potassium, ammonium, trimethylammonium and triethylammonium cations.

The terms "hydrolyzable esters" and "hydrolyzable acyl derivatives," as used herein, refer to those esters and acyl derivatives conventionally employed in the pentose and hexose art, preferably those derived from carboxylic acids of 1 to 12 carbon atoms. Conventional hydrolyzable ester and acyl groups thus include acetyl, propionyl, butyryl, valeryl, isovaleryl, hexanoyl, heptanoyl, octanoyl, nonanoyl, undecanoyl, lauroyl, benzoyl, phenylacetyl, phenylpropionyl, o-, m-, and p-toluoyl, β-cyclopentylpropionyl, and the like.

The term "lower alkyl" means a straight or branched chain hydrocarbon group containing from 1 to 6 carbon atoms, inclusive, such as methyl, ethyl, n-propyl, i-butyl, t-butyl, and the like. The term "lower alkenylmethyl" means an alkyl group containing a carbon to carbon double bond at other than the 1-position such as allyl and the like. The term "α-unsaturated alkenylmethyl" refers to alkenylmethyl groups having unsaturation at the alpha position of the alkenyl group, e.g. allyl. The term "aryl" means a hydrocarbon group consisting of one or more aromatic rings and containing from 6 to 12 carbon atoms, inclusive, such as phenyl, benzyl, o-tolyl, m-tolyl, p-tolyl, 3,5-xylyl, pentamethylphenyl, naphthyl, and the like. The term "substituted aryl" means an aryl group having one or more halo, nitro, alkoxy, or dialkylamino substituents in the aromatic ring such as p-chlorobenzyl, p-bromobenzyl, 2,4,6-trichlorophenyl, p-nitrophenyl, p-nitrobenzyl, p-anisyl, p-methoxybenzyl, p-dimethylaminophenyl, and the like. The above definitions also apply to derivatives from the defined terms, that is, lower alkoxy, lower alkenylmethoxy, aryloxy and substituted aryloxy.

The compounds of this invention are analogs of known pentose and hexose phosphates which are regulators of metabolic processes. These compounds are useful in regulating and controlling metabolism and for producing metabolic deficiencies in biological systems. These compounds can be used as intermediates for making phosphonate analogs of known nucleotide and nucleotide co-enzymes. The compounds of this invention differ from the known pentose and hexose phosphates and derivatives thereof in that the former contain a P—$CH_2$—C group in place of the natural P—O—C group, thereby conferring greater metabolic stability to the former. The pentose and hexose phosphonic acids and derivatives thereof of this invention are not sensitive to phosphatases and hence have greater metabolic stability than the corresponding phosphates.

The pentose and hexose phosphonic acids and glycosyl halide and 1-O-aliphatic acyl derivatives thereof this invention are also useful intermediates for the preparation of the corresponding nucleotide analogs, these being useful in controlling metabolism and for producing metabolic deficiencies in biological systems.

The 5 - deoxy - 5 - dihydroxyphosphinylmethyl-D-ribose and its esters and salts of this invention are prepared by a procedure which can be represented as follows:

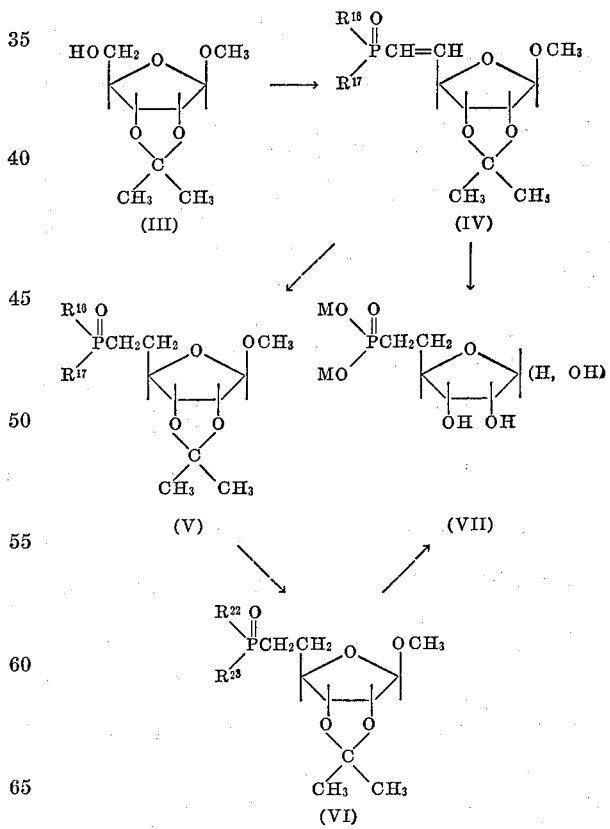

(III)   (IV)

(V)   (VII)

(VI)

In the above formulas.

$R^{16}$ and $R^{17}$ are phenoxy or substituted phenoxy;
$R^{22}$ and $R^{23}$ are lower alkoxy, lower alkenylmethoxy, benzyloxy, or substituted benzyloxy; and
M is as previsouly defined.

The methyl 2,3-O-isopropylidene-β-D-ribofuranoside of Formula III is first oxidized to the corresponding 5-aldehedo compound by reaction with a dialkylcarbodiimide in a dialkyl sulfoxide in the presence of a proton source such as dicyclohexylcarbodiimide in dimethyl sulfoxide, the proton source being pyridine and an acidic component such as phosphoric acid. The aldehedo compound is then reacted with diphenyl triphenylphosphoranylidemethyl- phosphonate or an ylid generated from, for example, tri- n - butyl - (diphenoxyphosphinylmethyl) - phosphonium chloride in the presence of a strong base such as an alkali metal alkoxide, preferably potassium t-butoxide in an inert organic solvent such as tetrahydrofuran, dioxane, dimethylformamide, dimethyl sulfozide, hexamethylphos- phoramide, t-butanol, methanol, ethanol, acetonitrile, or mixtures thereof, preferably a mixture of tetrahydrofuran and t-butanol. The reaction is conducted at a temperature of from 25° C. to the reflux temperature of the solvent preferably at about 25° C., for a period of from 1 to 48 hours to form the corresponding cis and trans isomers of methyl 5 - dehydro-5-deoxy-2,3-O-isopropylidene-5-di- phenoxyphosphinylmethylene-$\beta$-D-ribofuranoside of For- mula IV. The trans product is the major product. Since the cis and trans products are equally suitable as inter- mediates in the further steps of the process, their separation is unnecessary. The methyl 5-deoxy-2,3-O-iso- propylidene - 5 - diphenoxyphosphinylmethyl - $\beta$ - D - ri- bofuranoside is prepared by catalytically hydrogenerating the unsaturated compound of Formula IV at room tem- perature by conventional techniques such as in the pres- ence of a palladium on an inert support catalyst such as palladium-on-barium sulfate, palladium-on-calcium car- bonate, palladium-on-carbon and the like, in a lower alco- holic solvent such as methanol, ethanol, and the like to form the corresponding compound of Formula V.

The methyl 5 - deoxy-2,3-O-isopropylidene-5-dihydrox- yphosphinylmethyl-D-ribofuranoside esters of Formula VI are prepared by transesterifiying the compounds of Formula V. The transesterification is accomplished by treating the compounds of Formula V with the correspond- ing primary and secondary alcohols under anhydrous conditions in a dipolar organic solvent in the presence of a base. Suitable primary alcohols include lower alkanols such as methanol, ethanol, isopropanol, n-propanol, and the like of up to about 6 carbon atoms, aralkanols such as benzyl alcohol, o-, m- and p-methylbenzyl alcohol and the like, and lower alkenylmethanols such as allyl alcohol and the like. Suitable bases for generating the alkoxide or aralkozide include the alkali metal hydrides, alkali metals, alkali metal t-butoxide and the like. Suitable di- polar organic solvents include dimethylforamide, dimethyl sulfoxide and the like.

By catalytically hydrogenating the methyl 5-dehydro-5- deoxy-2,3-O-isopropylidene - 5 - diphenoxyphosphinyl- methylene - $\beta$ - D - ribofuranoside of Formula IV at room temperature by conventional techniques in the pres- ence of a platinum oxide catalyst in a lower alcoholic solvent such as methanol, ethanol and the like, methyl 5 - deoxy - 2,3 - O - isopropylidene - 5 - dihydroxyphos- phinylmethyl-$\beta$-D-ribofuranoside is obtained. The isopro- pylidene and methyl ether protecting groups can then be removed by acid hydrolysis, for example by passing the compound through a column of cation-exchange resin in the acid form and heating the resulting solution, or by treatment with a mineral acid or an organic acid such as trifluoroacetic acid, acetic acid, formic acid, trichloro- acetic acid and the like (preferably trifluoroacetic acid) at 20–100° C. for from 1 to 3 hours to yield the 5- deoxy - 5 - dihydroxyphosphinylmethyl-D-ribose of For- mula VII. When M in the compounds of Formula VII are desired to be pharmaceutically acceptable cations, the corresponding free phosphonic acid may be neutralized with the appropriate base, or another salt of the phos- phonic acid can be treated by conventional procedures with a cation exchange resin preloaded with the pharma- ceutically acceptable cation desired, cation exchange in the column producing the desired product. The free phosphonic acid can be obtained by ion exchange of the corresponding phosphonic acid salt with a cation ex- change resin in the acid form following conventional pro- cedures. Alternatively, by treating an appropriate salt with an equivalent of an inorganic acid such that the phosphonic acid or the resulting inorganic salt is insoluble facilitates separation of the phosphonic acid. For example, adding an equivalent of sulfuric acid to an aqueous solu- tion of a barium salt of the compound of Formula VII yields the free acid and a precipitate of barium sulfate.

When $R^{22}$ and $R^{23}$ of the compounds of Formula VI are benzyloxy, substituted benzyloxy or $\alpha$-unsaturated lower alkenylmethoxy such as allyloxy, they can be dealkylated by hydrogenolysis with palladium on an inert support catalyst in a lower alkanolic solvent to yield the methyl 5 - deoxy - 2,3 - O - isopropylidene - 5 - dihydroxyphos- phenylmethyl-$\beta$-D-ribofuranoside. After removal of the isopropylidene and methyl ether protecting groups with acid followed by treatment to obtain the desired cation for M as described above, the 5 - deoxy - 5 - dihydroxy- phosphinylmethyl-D-ribose or a desired pharmaceutically acceptable salt thereof of Formula VII is obtained.

The above procedures have been illustrated using methyl 2,3 - O - isopropylidene - $\beta$ - D-ribofuranoside as the start- ing material by way of example only. Following the same procedure with 1,2:3,4 - di - O - isopropylidene - $\alpha$ - D- galactopyranose, yields as the free phosphonic acid or its salts, 6 - deoxy - 6 - dihydroxyphosphinylmethyl-D- galactose and its pharmaceutically acceptable salts. The diesters obtained are correspondingly the diesters of 6- deoxy - 1,2:3,4 - di - O - isopropylidene - 6 - dihydroxy- phosphinylmethyl-$\alpha$-D-galactose.

The procedure for preparing the monoesters and di- esters according to this invention can be represented as follows:

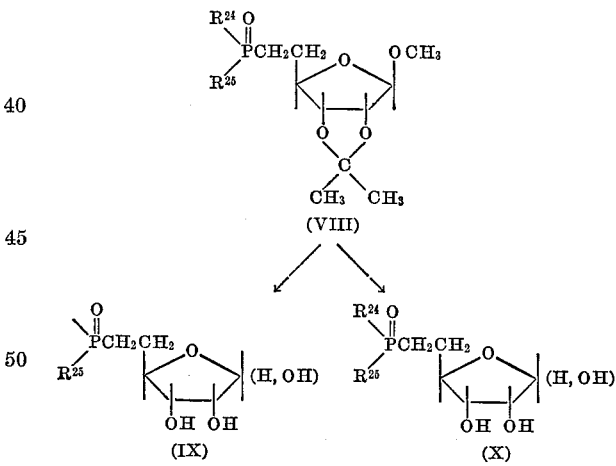

In the above formulas $R^{24}$, $R^{25}$ and M are as previously defined.

The monoesters of 5 - deoxy - 5 - dihydroxyphosphinyl- methyl-D-ribose of Formula IX are prepared by mono- dealkylation of the compounds of VIII by alkaline hydrol- ysis at room temperature in a solution of a strong alkali metal hydroxide such as lithium hydroxide or sodium hy- droxide in aqueous ethanol, dioxane, dimethyl sulfoxide, tetrahydrofuran, acetonitrile and the like for about 30 minutes to 2 hours or longer. When $R^{24}$ and $R^{25}$ are lower alkoxy, or lower alkenylmethoxy having unsaturation at other than the alpha position, monodealkylation can be obtained by conventional treatment with sodium iodide in dimethylformamide at 100° C. for 2 hours. The prod- uct is isolated by adding acetone to the reaction mixture, filtering the precipitated sodium salt of the monoester from the mixture and washing the precipitate with acetone. The 2,3 - O - isopropylidene and 1 - O - methyl protecting groups are then removed by treatment with an acid such as trifluoroacetic acid, and the desired free acid or pharmaceutically acceptable salt thereof is obtained by the techniques previously described.

The diesters of 5 - deoxy - 5 - dihydroxyphosphinyl-methyl-D-ribose of Formula X are prepared by removing the 2,3 - O - isopropylidene and 1 - O - methyl protecting groups with acid as previously described.

The above procedure was illustrated with diesters of 5-deoxy - 5 - dihydroxyphosphinylmethyl - D - ribose merely by way of example. Following the same procedures but using the diesters of 6-deoxy - 1,2:3,4 - di - O - isopropylidene-D-galactopyranose as the starting compound yields the corresponding monoesters of 6-deoxy - 6 - dihydroxyphosphinylmethyl-D-galactose and their pharmaceutically acceptable salts following the procedure described for preparing the compounds of Formula IX and yields the respective diesters of 6 - deoxy - 6 - dihydroxyphosphinyl-methyl-D-galactose following the procedure described for preparing the compounds of Formula X.

The remainder of the compounds of this invention are prepared by a procedure which can be represented as follows, the procedure being illustrated by way of representative example for preparing 5-deoxy - 5 - dihydroxyphosphinylmethyl-D-xylose, its monoesters and their salts and the corresponding diesters.

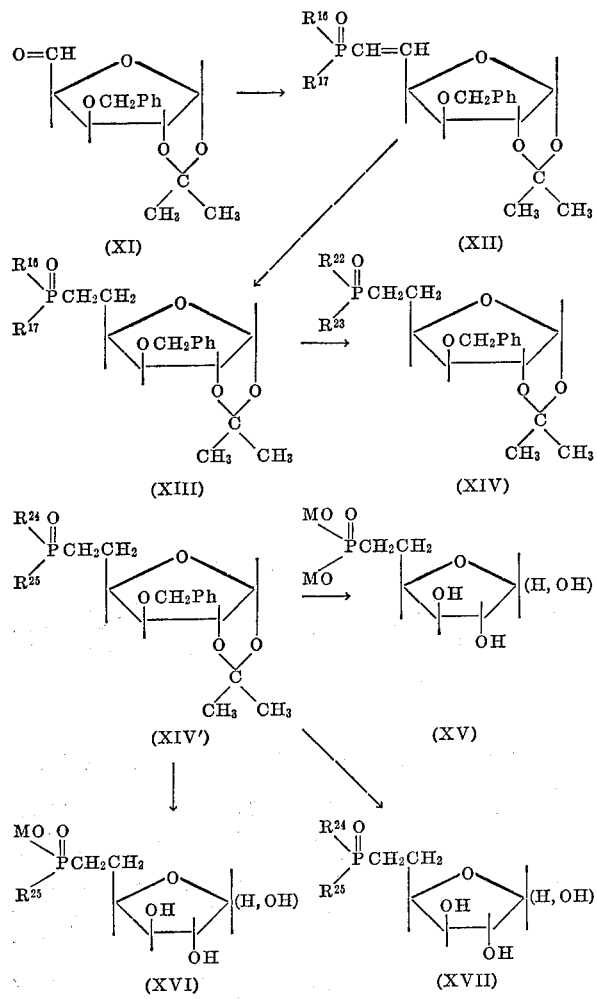

In the above procedure $R^{16}$, $R^{17}$, $R^{22}$, $R^{23}$, $R^{24}$, $R^{25}$ and M are as previously defined.

In the above procedure, the starting material illustrated is the aldehedo compound since 3 - O - benzyl - 1,2-O-isopropylidene - α - D - xylo - dialdopento - 1,4 - furanose is available as a starting material. In the event that the 5-hydroxy compounds are more available, they can be oxidized to the corresponding aldehedo compounds by reaction with a dialkylcarbodiimide in dialkyl sulfoxide in the presence of a proton source, for example, dicyclohexylcarbodiimide in dimethyl sulfoxide, the proton source being pyridine and an acid such as phosphoric acid or trifluoroacetic acid.

The 3 - O - benzyl - 1,2 - O - isopropylidene - α - D-xylo-dialdopent-1,4-furanose of Formula XI is converted to the corresponding 3 - O - benzyl - 5 - dehydro-5-deoxy-1,2 - O - isopropylidene - 5 - diphenoxyphosphinylmethylene-α-D-xylofuranose by reaction with diphenyl triphenyl-phosphoranylidenemethylphosphonate or with the ylid generated from tri-n-butyl - (diphenoxyphosphinylmethyl)-phosphonium chloride and a strong base such as potassium t-butoxide as described previously with respect to the preparation of the compounds of Formula IV. Both the cis and trans isomers are formed in this reaction, the trans isomer being the predominant product. Since both isomers are equally suitable for the remaining steps in the process, however, separation is unnecessary.

Reduction of the unsaturated compounds of Formula XII by reaction with potassium azodicarboxylate in anhydrous pyridine in the presence of glacial acetic acid yields the corresponding 3-O-benzyl-5-deoxy-1,2-O-isopropylidene-5-diphenoxyphosphinylmethyl-α-D - xylofuranose of Formula XIII. When the compounds of Formula XIII are transesterified by treatment with primary and secondary alcohols are previously described with respect to preparing the compounds of Formula VI, the corresponding lower alkyl, lower alkenylmethyl, benzyl and substituted benzyl diesters of 3-O-benzyl-5-deoxy-1,2-O-isopropylidene-5-diphenoxyphosphinylmethyl-α-D - xylofuranose of Formula XIV are obtained.

When $R^{24}$ and $R^{25}$ in the compounds of Formula XIV′ are benzyloxy, substituted benzyloxy or α-unsaturated lower alkenylmethoxy such as allyloxy, the compounds can be converted to the corresponding 5-deoxy-1,2-O-isopropylidene-5-dihydroxyphosphinylmethyl - α - D - xylofuranose by catalytic hydrogenolysis at room temperature by conventional techniques such as in the presence of palladium on an inert support catalyst such as palladium-on-carbon, palladium-on-barium sulfate, palladium-on-calcium carbonate and the like and a lower alcoholic solvent such as methanol, ethanol and the like to form the corresponding dealkylated, debenzylated compounds. Treatment of the product with acid to hydrolyze the 1,2-O-isopropylidene group followed by treatment to obtain the desired cation for M as previously described for the preparation of the compounds of Formula VII yields the corresponding 5-deoxy-5-dihydroxyphosphinyl-methyl-D-xylose or its pharmaceutically acceptable salts of Formula XVI.

The monoesters of 5-deoxy-5-dihydroxyphosphinylmethyl-D-xylose of Formula XVI are prepared by monodealkylation of the corresponding diesters of Formula XIV′ such as by alkaline hydrolysis at room temperature in a solution of a strong alkali metal hydroxide such as lithium hydroxide or sodium hydroxide in aqueous ethanol, dioxane, dimethyl sulfoxide, tetrahydrofuran, acetonitrile, and the like for about 30 minutes to 2 hours or longer. When $R^{24}$ and $R^{25}$ of Formula XIV′ are lower alkoxy, or lower alkenylmethoxy having unsaturation at other than the alpha position, monodealkylation can be obtained by conventional treatment with sodium iodide in dimethylformamide at 100° C. for 2 hours. The product is isolated by adding acetone, filtering the precipitated sodium salt of the monoester form the mixture, and washing the filtrate with acetone. The 3-O-benzyl protecting group is then removed by catalytic hydrogenolysis at room temperature in the presence of a palladium on an inert support catalyst such as palladium-on-carbon in a lower alcoholic solvent as previously described. The 1,2-O-isopropylidene protecting group is hydrolyzed by treatment with acid such as by passing the column of cation-exchange resin in the acid form and heating the resulting solution or by treatment with acetic acid, formic acid, trichloroacetic acid, trifluoroacetic acid or the like. When M in the compounds of Formula XVI are desired to be pharmaceutically acceptable cations or when the free acid is desired, the desired cation for M can be obtained by the procedures previously described with respect to the preparation of the compounds of Formula VII.

The diesters of 5-deoxy-5-dihydroxyphosphinylmethyl-D-xylose of Formula XVII are prepared from the corresponding protected diesters of Formula XIV' by removal of the 3-O-benzyl protecting group by catalytic hydrogenolysis, and removal of the 1,2-O-isopropylidene group by acid hydrolysis, all as previously described to obtain the diesters of Formula XVII.

In the last illustrated procedure, by replacing 3-O-benzyl-1,2-O-isopropylidene-α-D-xylofuranose of Formula XI with the aldehedo compounds obtained by oxidizing methyl 2,3-di-O-benzyl-D-lyxofuranoside, methyl 2,3-di-O-benzyl-α-d-arabinofuranoside, methyl 3-O-benzyl-2-deoxy-D-ribofuranoside, methyl 2,3,4-tri-O-benzyl-α-D-glucopyranoside, and methoyl 2,3,4-tri-O-benzyl-α-D-mannopyranoside yields the corresponding dihydroxyphosphinylmethyl compounds and their salts, the corresponding monoesters and their salts, and the corresponding diesters.

The 1-O-acyl-5,6-dideoxy-D-hexofuranose 6-phosphonates, 5,6-dideoxy-D-hexofuranosyl halide 6-phosphonates, 1-O-acyl-6,7-didedoxy-D-heptopyranose 7-phosphonates, and 6,7-dideoxy-D-heptopyranosyl halide 7-phosphonates of this invention can be prepared by a procedure represented as follows, the choice of ribose compounds for the illustration being merely by way of representative example:

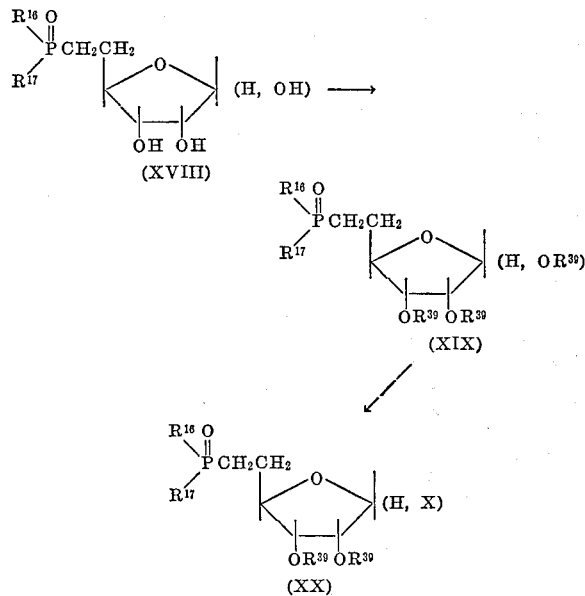

In the above formulaes $R^{16}$ and $R^{17}$ are as previously defined,
$R^{39}$ is lower aliphatic acyloxy, and
X is chloro or bromo.

The compounds of Formula XIX are prepared by reacting the compounds of Formula XVIII with a lower aliphatic carboxylic acid anhydride in pyridine to yield the corresponding 1-O-(lower aliphatic acyl) derivative. Acylation of the hydroxy groups at the 2 and 3 positions occurs at the same time. This procedure is equally suitable for use with the corresponding hexose and heptose compounds having hydrogen at the 2-position in the "β" configuration, that is, the corresponding galactose, glucose, xylose and 2-deoxyribose compounds.

The corresponding hexose and heptose compounds starting compounds having a 2-hydroxy group in the β configuration should have 2,3-di-O-benzyl or 2,3-di-O-(substituted benzyl) protecting groups. The above procedure repeated with these protected compounds yields the corresponding 1-O-(lower aliphatic acyl)-2,3-di-O-benzyl or 1-O-(lower aliphatic acyl)-2,3-di-O-(substituted benzyl) derivatives. This modified procedure is used with the corresponding arabinose, lyxose and mannose compounds.

The glycosyl bromide compounds of Formula XX (X is bromo) are prepared by reacting the corresponding 1-O-acyl compounds of Formula XIX with hydrogen bromide in glacial acetic acid in the presence of acetic anhydride. The glycosyl chloride compounds of Formula XX (X is chloro) are prepared by reacting the corresponding 1-O-acyl compounds of Formula XIX with hydrogen chloride in methylene chloride, for example. This procedure, although illustrated above for ribose compounds, is equally suitable for preparing the glycosyl halide derivatives from the 1-O-(lower aliphatic acyl) compounds of the galactose, xylose, lyxose, arabinose, 2-deoxyribose, glucose and mannose series of this invention.

The compounds of Formulas C and D are useful intermediates for preparing the corresponding nucleotide analogs by procedures described in application Ser. No. 803,417 filed Feb. 28, 1969 titled "2'-Cyclic Esters and 5'-Cyclic Esters of 3'-Deoxy-3'-Dihydroxyphosphinylmethyl-β-D-Ribofuranosyl Nucleoside Derivatives and Intermediates Therefore," the inventors being Gordon H. Jones and John G. Moffatt.

Following the procedures of the above application, the compounds of Formulas C and D wherein $R^{29}$ is lower aliphatic acyloxy are mixed with 6-benzamido purine, 6-benzamido-7-deaza purine, 6-chloropurine or 2,6-dichloropurine in a melt with p-toluene sulfonic acid, dichloroacetic acid, sulfamic acid, or di-p-nitrophenylphosphoric acid, for example, at about 160° C. The mixture is maintained at this temperature until a homogeneous melt is formed, that is, from about 10 minutes to about 1 hour. Following purification and removal of protecting groups by conventional procedures the products obtained have adenine-9-yl, 7-deazaadenine-9-yl, 6-chloropurine-9-yl, or 2,6-dichloropurine-9-yl groups, respectively, at the 1-β position.

The compounds of Formulas C and D having chloro or bromo at the 1-position ($R^{29}$ is bromo or chloro) can also be converted to nucleosides by procedures described in the above application. The chloro or bromo compounds of Formulas C and D are reacted with known mercury derivatives of certain purine and pyrimidine bases prepared, for example as described in J. Amer. Chem. Soc. 73, 1650 (1951). These mercury derivatives (sometimes described as the mercury salt of mercury chloride salt of the bases) are usually prepared by reacting mercuric chloride and a suitably protected base in the presence of potassium or sodium hydroxide. An anhydrous solution of the purine or pyrimidine base mercury compounds (the base being suitably protected if necessary) and the halo compounds of Formulas C and D are refluxed in an inert organic solvent such as xylene for from 15 minutes to 4 hours. The reaction product is purified by conventional techniques and the protecting groups are removed to yield the corresponding nucleoside compounds. In this procedure, the purine and pyrimidine bases can include cytosin-1-yl, 5-thymin-1-yl, trifluoromethyluracil-1-yl, 5-trifluoromethylcytosin - 1 - yl, hypoxanthin - 9-yl, 7-deazaguanin-9-yl, 6-dimethylaminopurin-9-yl, guanin-9-yl, 2,6-diaminopurin-9-yl, 8-azadenine-9-yl, and 8-azaguanin-9-yl.

By another procedure described in the above application, the compounds of Formulas C and D wherein $R^{29}$ is bromo or chloro are reacted with the pyrimidine or purine base (with suitable protecting groups) in anhydrous acetonitrile under reflux conditions for 4 to 36 hours followed by purification, treatment with methanolic ammonia and then with an aqueous alkali metal hydroxide solution to yield the corresponding nucleosides. The pyrimidine or purine base reactants can include 5-fluoro-2,4-dimethoxypyrimidine, 2,4-dimethoxypyrimidine, 5-methyl-2,4-dimethoxypyrimidine and 2,4-dimethoxy-6-azapyrimidine. These base reactants yield the corresponding nucleosides wherein the pyrimidine or purine base at the 1-β position is a 5-fluoro-cytosin-1-yl, cytosin-1-yl, 5-methylcytosin-1-yl or 6-azacytosin-1-yl group.

The starting compounds for preparing the compounds of this invention using the procedures described herein are known in the art or are readily obtainable from known compounds by procedures which are well-known and conventional. Methyl 2,3-di-O-benzyl-α-D-arabinofuranoside and its preparation are described in J. Amer. Chem. Soc. 87, 4636. Methyl 2-deoxy-D-ribofuranoside and its preparation are described in J. Amer. Chem. Soc. 83, 4066 (1961) and U.S. Pat. 2,949,449. Methyl 2,3,4-tri-O-benzyl-α-D-glucopyranoside and its preparation are described in Tetrahedron 21, 1897 (1965). Methyl 6-O-trityl-α-D-mannopyranoside and its preparation are described in J. Amer. Chem. Soc. 61, 1528 (1939). Methyl 5-O-trityl-D-lyxofuranoside and its preparation are described in a M. Sc. Thesis No. 138 of M. Vorobeitchick at University of Brussels (1955). Starting compounds are also disclosed in U.S. application Ser. No. 643,078 filed June 2, 1967.

The phosphorylated phosphonium ylids reactants have been previously disclosed together with procedures for their preparation in U.S. application Ser. No. 709,234 filed Feb. 29, 1968. In general these compounds are prepared by reacting diphenyl chloromethylphosphonate and tri-n-phenylphosphine or tri-n-butylphosphine. In this reaction, the reactants are condensed under substantially anhydrous conditions in a non-reactive organic solvent such as tetrahydrofuran, dioxane, benzene, diethyl ether, hexane, and the like, and mixtures thereof, at a temperature of about 0° C. reflux temperature of the solvent, for a period of about ½ to about 12 hours. Preferably, the condensation is performed in diethyl ether, hexane, tetrahydrofuran, benzene or mixtures thereof.

Although the molar proportion of the reactants is not critical, a preferred embodiment of two moles of the phosphonium ylid per mole of the disubstituted phosphoryl halide is convenient.

In the practice of the above sequence, the reaction is advantageously performed in the presence of an inert atmosphere such as a nitrogen atmosphere, an argon atmosphere, and the like.

PREPARATION A

Diphenyl tri-n-butylphosphoranylidenemethylphosphonate

A solution of 84.6 g. (0.3 moles) of diphenyl chloromethylphosphonate and 60.6 g. (0.3 moles) of tri-n-butylphosphine in 250 ml. of xylene is heated under reflux in a dry argon atmosphere for 24 hours. The reaction mixture is then cooled in ice water and on seeding, deposits white crystals. These are collected by filtration and washed with benzene, ether and air dried to yield tri-n-butyl-(diphenoxyphosphinylmethyl)-phosphonium chloride.

A solution of 485 mg. (1.0 mmole) of this compound in 10 ml. of water is treated with 2 N aqueous sodium hydroxide solution until the pH of the solution is about 8. The white precipitate which forms is removed by filtration, washed with water and dried to yield diphenyl tri-n-butylphosphoranylidenemethylphosphonate.

This compound is fairly unstable and should be used immediately. Preferably, it is prepared in situ.

PREPARATION B

Dimethyl tri-n-butylphosphoranylidenemethylphosphonate

A solution of 535 mg. of tri-n-butyl-(diphenoxyphosphinylmethyl)-phosphonium chloride and 125 mg. of potassium-t-butoxide in 10 ml. of dry methanol is allowed to stand at room temperature for 10 minutes. Quantitative gas-liquid chromatographic examination of the reaction mixture is used to determine when the transesterification is complete as determined by the amount of phenol liberated. The resulting solution containing the dimethyl tri-n-butylphosphoranylidenemethylphosphonate is used directly.

EXAMPLE 1

Methyl 2,3,4-tri-O-benzyl-α-D-mannopyranoside

Methyl 6-O-trityl-α-D-mannopyranoside (9 g.) is dissolved in dry dioxane (100 ml.), and after adding powdered potassium hydroxide (40 g.), the suspension is refluxed while benzyl chloride (50 ml.) is added over a period of 1.5 hours. After an additional 3 hours under reflux, the solution is cooled, diluted with water and extracted with chloroform. The organic phase is further extracted with water, dried over sodium sulfate and evaporated under reduced pressure (final evaporation at 110° C. at 1 mm. Hg. pressure) to remove benzyl alcohol. The residue, which is essentially pure methyl 2,3,4-tri-O-benzyl-6-O-trityl-α-D-mannopyranoside is dissolved in glacial acetic acid (100 ml.) diluted with water (20 ml.), and the mixture is heated at 100° C. for 1 hour. After cooling, crystalline triphenylcarbinol is removed by filtration, and the filtrate is evaporated to dryness under reduced pressure. The residue is dissolved in chloroform, washed with aqueous sodium bicarbonate, dried and evaporated leaving crude methyl 2,3,4-tri-O-benzyl-α-D-mannopyranoside which is purified by chromatography on a column of silic acid.

EXAMPLE 2

Methyl 3-O-benzyl-2-deoxy-D-ribofuranoside

A solution of 10 mmoles of methyl 2-deoxy-D-ribofuranoside in 75 ml. of anhydrous pyridine is treated with 3.0 g. of 4-monomethoxytrityl chloride at room temperature for 2 hours. The reaction mixture is poured into excess ice water with vigorous stirring, and the aqueous mixture is extracted with ethyl acetate (3× 100 ml.). The combined ethyl acetate extracts are dried over magnesium sulfate, filtered and evaporated to dryness to give syrupy methyl 2-deoxy-5-O-(4-monomethoxytrityl)-D-ribofuranoside which is purified by chromatography on neutral alumina.

Repeating the procedure of Example 1 but replacing methyl 6-O-trityl-α-D-mannopyranoside with 2-deoxy-5-O-(4-monomethoxytrityl) - 2 - deoxyribofuranoside yields methyl 3-O-benzyl-2-deoxy-D-ribofuranoside.

EXAMPLE 3

Methyl 2,3-di-O-benzyl-D-lyxofuranoside

Repeating the procedure of Example 1 but replacing methyl 6-O-trityl-α-D-mannopyranoside with methyl 5-O-trityl-D-lyxofuranoside yields the corresponding methyl 2,3-di-O-benzyl-D-lyxofuranoside.

EXAMPLE 4

Methyl 2,3-O-isopropylidene-β-D-ribo-dialdopento-1,4-furanoside

To a solution of methyl 2,3-O-isopropylidene-β-D-ribofuranoside (10 mmoles) in 25 ml. of anhydrous dimethyl sulfoxide are added 6.2 g. of dicyclohexylcarbodiimide, 0.8 ml. of pyridine and 1 ml. of a 5 M solution of phosphoric acid in dimethyl sulfoxide. The resulting solution is allowed to stand at 25° for 16 hours, during which time dicyclohexylurea precipitates from the solution. At the end of the reaction, 2.6 g. of oxalic acid dihydrate dissolved in 10 ml. of methanol is added, and the resulting mixture left at room temperature for a further 30 minutes. The dicyclohexylurea is removed by filtration, washed thoroughly with ethyl acetate, and the combined filtrate and washings are extracted 3 times with water. The organic phase is then dried over magnesium sulfate, filtered and evaporated to dryness to give a mobile oil. This oil is distilled at a bath temperature of approximately 100° C. and a pressure of $10^{-3}$ mm. to give a viscous syrup which is methyl 2,3-O-isopropylidene-β-D-ribo-dialdopento-1,4-furanoside. The product is crystallized

EXAMPLE 5

Methyl 5-dehydro-5-deoxy-2,3-O-isopropylidene-5-diphenoxyphosphinylmethylene-β-D-ribofuranoside A solution of methyl 2,3-O-isopropylidene-β-D-ribodialdopento-1,4-furanoside (10 mmole) in 50 ml. of tetrahydrofuran and 50 ml. of t-butanol is treated with a solution of 5.35 g. of tri-n-butyl-(diphenoxyphosphinylmethyl)-phosphonium chloride and 1.25 g. of potassium t-butoxide in 100 ml. of dry tetrahydrofuran. The solution is then stored at room temperature for 60 minutes. The reaction mixture is then evaporated to a small volume under reduced pressure, and the residue partitioned between 250 ml. of ethyl acetate and water. The organic phase is dried over magnesium sulfate, filtered and evaporated to dryness to give an oil. This oil is dissolved in benzene and applied to a silica gel colume (35 x 3.5 cm.) of silica gel prepared in benzene. Elution of the column with benzene containing increasing amounts of chloroform or ethyl acetate yields methyl 5-dehydro-5-deoxy-2,3-O-isopropylidene-5 - diphenoxyphosphinylmethylene-β-D-ribofuranoside. This material can be further purified by distillation under high vacuum in a short path apparatus.

The product formed is a mixture of cis and trans isomers, predominantly the trans isomer.

EXAMPLE 6

Methyl 5-dehydro-5-deoxy-2,3-O-isopropylidene-5-diphenoxyphosphinylmethylene-β-D-ribufuranoside (alternate procedure)

To a solution of 10 mmoles of methyl 2,3-isopropylidene-β-D-ribofuranoside in 25 ml. of anhydrous dimethyl sulfoxide are added 6.2 g. of dicyclohexylcarbodiimide, 0.8 ml. of pyridine and 1 ml. of a 5 M solution of anhydrous phosphoric acid in dimethyl sulfoxide. The resulting mixture is allowed to stand at 25° C. for 6 hours during which time dicyclohexylurea pricipitates from the solution. At the end of the reaction dicyclohexylurea is removed by filtration and washed with several portions of fresh anhydrous dimethyl sulfoxide. To the combined filtrate and washings is aded 5.08 g. of diphenyltriphenylphosphoranylidenemethylphosphonate, and the resulting mixture is allowed to stand at 37° C. for 16 hours. A solution of 2.6 g. of oxalic acid dihydrate in 10 ml. of methanol is added, and after being allowed to stand at room temperature for a further 30 minutes, a further amount of dicyclohexylurea is removed by filtration. The dicyclohexylurea is washed thoroughly with ethyl acetate and the combined filtrate and washings are extracted three times with 100 ml. portions of water. The organic phase is then dried over magnesium sulfate, filtered and evaporated to dryness to give a semi-crystalline residue. This residue is dissolved in benzene and purified by silica gel chromatography as described in Example 5 to yield methyl 5-dehydro-5-deoxy-2,3-O-isopropylidene - 5 - diphenoxyphosphinylmethylene-β-D-ribofuranoside.

EXAMPLE 7

Methyl 5-deoxy-2,3-O-isopropylidene-5-diphenoxyphosphinylmethyl-β-D-ribofuranoside A solution of 1 mmole of methyl 5-dehydro-5-deoxy-2,3-O-isopropylidene-5-diphenoxyphosphinylmethylene-β-D-ribofuranoside in 30 ml. of methanol is hydrogenated at 20° C. in the presence of 0.2 g. of a pre-reduced 5% palladium-on-barium sulfate catalyst under a slight positive pressure of hydrogen for 2 hours. At this time the uptake of hydrogen reached a theoretical value. The catalyst is removed by filtration through diatomaceous earth which is then washed with methanol. The combined filtrate and washings are evaporated to dryness under reduced pressure to yield methyl 5-deoxy-2,3-O-isopropylidene-5-diphenoxyphosphinylmethyl-β-D - ribofuranoside, which if desired may be further purified by distillation under reduced pressure using a short path apparatus.

EXAMPLE 8

6-deoxy-1,2:3,4-Di-O-isopropylidene-6-diphenoxyphosphinylmethyl-α-D-galactopyranose Repeating the sequential procedures of Examples 4, 5, 6 and 7 but replacing methyl 2,3-O-isopropylidene-β-D-ribofuranoside as the starting material with 1,2:3,4-di-O-isopropylidene - α - D - galactopyranose yields 6-deoxy-1,2:3,4-di-O-isopropylidene-6-diphenoxyphosphinylmethyl-α-D-galactopyranose.

EXAMPLE 9

Other diesters of methyl 5-deoxy-2,3-O-isopropylidene-5-dihydroxyphosphinylmethyl-β-D-ribofuranoside A solution of 10 mmoles of methyl 5-deoxy-2,3-isopropylidene - 5 - diphenoxyphosphinylmethyl-β-D-ribofuranoside in 50 ml. of dimethyl sulfoxide is added rapidly at room temperature to a solution of 2.0 g. of sodium hydroxide (50% dispersion in mineral oil) in 20 ml. each of benzyl alcohol and dimethyl sulfoxide. After 15 minutes, the yellow solution is poured into 250 ml. of water containing 3 ml. of acetic acid. The resulting suspension is extracted with ethyl acetate (3 × 200 ml.) and the combined extracts are washed with aqueous sodium bicarbonate and then twice with water. The organic phase is dried over magnesium sulfate, filtered and evaporated to dryness to give a mobile oil. The solution of this oil in benzene is then applied to the top of a silica gel column (35 x 4 cm.), and the column is eluted with benzene containing increasing amounts of chloroform or ethyl acetate to yield methyl 5-deoxy-2,3-O-isopropylidene-5-dibenzyloxyphosphinylmethyl-β-D-ribofuranoside.

Repeating the above procedure but replacing benzyl alcohol with methanol, ethanol, isopropanol, n-propanol, allyl alcohol, and p-methylbenzyl alcohol yields the corresponding compounds containing the respective 5-dimethoxyphosphinylmethyl-, 5-diethoxyphosphinylmethyl-, 5-diisopropyloxyphosphinylmethyl-, 5-di(n-propyloxy)phosphinylmethyl-, 5-diallyloxyphosphinylmethyl-, and 5-(p-methylbenzyloxy)phosphinylmethyl- groups.

EXAMPLE 10

Other diesters of 6-deoxy-1,2:3,4-di-O-isopropylidene-6-dihydroxyphosphinylmethyl-α-D-galactopyranose Repeating the procedures of Example 9 with 6-deoxy-1,2:3,4 - di - O-isopropylidene - 6 - diphenoxyphosphinylmethyl-α-D-galactopyranose yields the corresponding diesters, that is, 6-deoxy-1,2:3,4-di-O-isopropylidene-α-D-galactopyranose having 6-dibenzyloxyphosphinylmethyl-, 6 - dimethoxyphosphinylmethyl-, 6 - diethoxyphosphinyl-6-diisopropyloxyphosphinylmethyl-, 6 - di(n-propyloxy) phosphinylmethyl-, 6-diallyloxyphosphinylmethyl-, and 6-(p - methylbenzyloxy)phosphinylmethyl groups, respectively.

EXAMPLE 11

Barium salt of 5-deoxy-5-dihydroxyphosphinylmethyl-D-ribose

A solution of 10 mmoles of methyl 5-deoxy-2,3-O-isopropylidene - 5 - dibenzyloxyphosphinylmethyl-β-D-ribofuranoside in 50 ml. of methanol is added to a pre-reduced suspension of 2 g. of 5% palladium-on-barium sulfate in 100 ml. of methanol. The resulting mixture is stirred at room temperature under 1 atmosphere of hydrogen for approximately 1 hour, at which time the theoretical volume of hydrogen has been consumed. The catalyst is removed by filtration through diatomaceous earth, and the combined filtrate and washings are evaporated to dryness. During this procedure, some of the isopropylidene groups may be removed and complete removal of the protecting groups is ensured by dissolving the above residue in 25 ml. of 90% trifluoroacetic acid. After the compound dissolves, the mixture is kept for 15 minutes at room temperature, and the solvent evaporated in vacuo at a bath temperature of less than 50° C. Final traces of trifluoroacetic acid are removed by continued re-evaporation of the residue with ethanol. The residue is dissolved in 10 ml. of water, 1½ equivalents of barium acetate is added, and the pH of the solution is brought to approximately pH 8 by the addition of barium hydroxide solution. The addition of 2 volumes of ethanol then precipitates the barium salt of 5-deoxy-5-dihydroxyphosphinylmethyl-D-ribose.

EXAMPLE 12

Barium salt of 6-deoxy-6-dihydroxy-phosphinylmethyl-D-galactose

Repeating the procedure of Example 11 with 6-deoxy-1,2:3,4-di-O-isopropylidene - 5 - dibenzyloxyphosphinylmethyl-α-D-galactopyranose yields the corresponding 6-deoxy-6-dihydroxyphosphinylmethyl-D-galactose.

EXAMPLE 13

Barium salt of 5-deoxy-5-dihydroxyphosphinyl-methyl-D-ribose (alternate procedure)

A solution of 10 mmoles of methyl 5-dehydro-5-deoxy-2,3- O - isopropylidene-5-diphenoxyphosphinylmethylene-β-D-ribofuranoside in 50 ml. of methanol is added to a pre-reduced suspension of 2 g. of platinum oxide in 100 ml. of methanol. The resulting mixture is stirred at room temperature under one atmosphere of hydrogen until the theoretical volume of hydrogen has been consumed (approximately 1 hour). The catalyst is removed by filtration through diatomaceous earth, and the combined filtrate and washings are evaporated. Removal of protecting groups and further purification are obtained by repeating the respective procedures described in Example 12 to yield the barium salt of 5-deoxy-5-dihydroxyphosphinylmethyl-D-ribose.

EXAMPLE 14

Barium salt of 6-deoxy-6-dihydroxyphosphinylmethyl-α-D-galactose (alternate procedure)

Repeating the procedure of Example 13 with 6-deoxy-1,2:3,4-di-O-isopropylidene - 6 - diphenoxyphosphinylmethyl-α-D-galactopyranose yields the corresponding barium salt of 6-deoxy-6-dihydroxyphosphinylmethyl-D-galactose.

EXAMPLE 15

Calcium salts of monoesters of 5-deoxy-5-dihydroxyphosphinylmethyl-D-ribose

To a solution of 1 mmole of methyl 5-deoxy-2,3-O-isopropylidene - 5 - diphenoxyphosphinylmethyl-β-D-ribofuranoside in 25 ml. of dioxane and 25 ml. of water is added 4 ml. of a 1 N aqueous solution of lithium hydroxide. The resulting solution is allowed to stand at 20° C. for 1 hour after which time the pH of the solution is adjusted to 7 by the addition of an acidic ion exchange resin. After removing the resin by filtration, the filtrate is evaporated to dryness under reduced pressure to yield methyl 5-deoxy-2,3-isopropylidene-5-(P-hydroxy-P-phenoxyphosphinylmethyl) - β - D - ribofuranoside. This compound is then dissolved in 5 ml. of 90% trifluoroacetic acid, and the resulting solution is set aside at room temperature for about 15 minutes, after which time the reaction mixture is evaporated to dryness under reduced pressure at a bath temperature of less than 50° C. The residue is free from final traces of trifluoroacetic acid by repeated evaporation from ethanol to yield 5-deoxy-5-P-hydroxy-P-phenoxyphosphinylmethyl) - D - ribose contaminated with lithium trifluoroacetate. The product is purified by dissolving it in ethanol followed by treatment with 2 mmoles of triethylamine and 2 equivalents of calcium chloride solution in ethanol. The calcium salt of 5-deoxy-5 - (P-hydroxy-P-phenoxyphosphinylmethyl)-D-ribose is removed by centrifugation, washed with ethanol and dried.

Repeating this procedure but at a higher temperature such as 50° C. with products of Example 9 yields the corresponding calcium salts of the respective methyl, ethyl, isopropyl, and n-propyl monoesters of 5-deoxy-5-dihydroxyphosphinylmethyl-D-ribose.

EXAMPLE 16

Calcium salts of monoesters of 6-deoxy-6-dihydroxyphosphinylmethyl-D-galactose

Repeating the procedure of Example 15 with products of Examples 8 and 10 yields the corresponding calcium salts of the respective phenyl, methyl, ethyl, isopropyl and n-propyl monoesters of 6-deoxy-6-dihydroxyphosphinylmethyl-D-galactose.

EXAMPLE 17

Diesters of 5-deoxy-5-dihydroxyphosphinylmethyl-D-ribose

A solution of 1 mmole of methyl 5-deoxy-2,3-isopropylidene - 5 - diphenoxyphosphinylmethyl - β - D - ribofuranoside in 5 ml. of 90% trifluoroacetic acid is allowed to stand at room temperature for 15 minutes. Trifluoroacetic acid is removed by evaporation in vacuo at a bath temperature of less than 50° C. The residue is freed from traces of trifluoroacetic acid by repeated evaporation with ethanol to give 5-deoxy-5-diphenoxyphosphinylmethyl-D-ribose.

Repeating this procedure with products of Example 9 yields the corresponding dimethyl, diethyl, diisopropyl and di-(n-propyl) esters of 5-deoxy-5-dihydroxyphosphinylmethyl-D-ribose.

EXAMPLE 18

Diesters of 6-deoxy-6-dihydroxyphosphinylmethyl-D-galactose

Repeating the procedure of Example 17 with the products of Examples 8 and 10 yields the corresponding diphenyl, dimethyl, diethyl, diisopropyl, and di-(n-propyl) esters of 6 - deoxy - 6 - dihydroxyphosphinylmethyl-D-galactose.

EXAMPLE 19

Aldehedo compounds

Repeating the procedure of Example 4 but replacing methyl 2,3-O-isoproylidene-β-D-ribofuranoside with:

methyl 2,3-di-O-benzyl-D-lyxofuranoside,
methyl 2,3-di-O-benzyl-α-D-arabinofuranoside,
methyl 3-O-benzyl-2-deoxy-D-ribofuranoside,
methyl 2,3,4-tri-O-benzyl-α-D-glucopyranoside, and
methyl 2,3,4-tri-O-benzyl-α-D-mannopyranoside yields the corresponding aldehedo compounds, that is, methyl 2,3-di-O-benzyl-D-lyxo-dialdopento-1,4-furanoside,
methyl 2,3-di-O-benzyl-α-D-arabino-dialdopento-1,4-furanoside,
methyl 3-O-benzyl-2-deoxy-D-erythro-dialdopento-1,4-furanoside,
methyl 2,3,4-tri-O-benzyl-α-D-gluco-dialdohexo-1,5-pyranoside, and
methyl 2,3,4-tri-O-benzyl-α-D-manno-dialdohexo-1,5-pyranoside.

EXAMPLE 20

5 - dehydro - 5 - diphenoxyphosphinylmethylene - D-furanosides and 6 - dehydro - 6 - deoxy - 6 - diphenoxyphosphinylmethylene-D-pyranosides Repeating the procedure of Example 5 but replacing 2,3 - O - isopropylidene - β - D - ribo - dialdopento - 1,4-furanoside with 3 - O - benzyl - 1,2 - O - isopropylidene-α-D-xylo - dialdopento - 1,4 - furanoside and the products of Example 19 yields the corresponding cis and trans isomers of:

3-O-benzyl-5-dehydro-5-deoxy-1,2-O-isopropylidene-5-diphenoxyphosphinylmethylene-α-D-xylofuranose,
methyl 2,3-di-O-benzyl-5-dehydro-5-deoxy-5-diphenoxyphosphinylmethylene-D-lyxofuranoside,
methyl 2,3-di-O-benzyl-5-dehydro-5-deoxy-5-diphenoxyphosphinylmethylene-α-D-arabinofuranoside,
methyl 3-O-benzyl-5-dehydro-2,5-dideoxy-5-diphenoxyphosphinylmethylene-D-ribofuranoside,
methyl 2,3,4-tri-O-benzyl-6-dehydro-6-deoxy-6-diphenoxyphosphinylmethylene-α-D-glucopyranoside, and
methyl 2,3,4-tri-O-benzyl-6-dehydro-6-deoxy-6-diphenoxyphosphinylmethylene-α-D-mannopyranoside.

EXAMPLE 21

5 - deoxy - 5 - diphenoxyphosphinylmethyl - D - furanose and 6 - deoxy - 6 - diphenoxyphosphinylmethyl - D - pyranose compounds To a vigorously stirred mixture of 10 mmoles of 3-O-benzyl - 5 - dehydro - 5 - deoxy - 1,2 - O - isopropylidene-5 - diphenoxyphosphinylmethylene-α-D-xylofuranose, and 10 g. of potassium azodicarboxylate in 150 ml. of anhydrous pyridine is added 6.0 g. of glacial acetic acid. The yellow suspension is stirred under anhydrous conditions in an argon atmosphere for 24 hours, and then the pyridine is removed by evaporation under reduced pressure. The yellow residue is partitioned between water (250 ml.) and ethyl acetate (250 ml.), and the water phase is further extracted with ethyl acetate (2×250 ml.). The combined organic phases are washed with water (500 ml.), dried over magnesium sulfate, filtered and evaporated to dryness to give a pale yellow syrup. This syrup is dissolved in benzene, and purified by chromatography on a silica gel column (35 x 3.5 cm.) using increasing amounts of chloroform or ethyl acetate in benzene to elute the product which may be further purified by high vacuum distillation in a short path apparatus to give 3-O-benzyl-5-deoxy - 1,2 - O - isopropylidene-5-diphenoxyphosphinylmethyl-α-D-xylofuranose.

Repeating the above procedure with the other products of Example 20 yields the corresponding:

methyl 2,3-di-O-benzyl-5-deoxy-5-diphenoxyphosphinylmethyl-D-lyxofuranoside,
methyl 2,3-di-O-benzyl-5-deoxy-5-diphenoxyphosphinylmethyl-α-D-arabinofuranoside,
methyl 3-O-benzyl-2,5-dideoxy-5-diphenoxyphosphinylmethyl-D-ribofuranoside,
methyl 2,3,4-tri-O-benzyl-6-deoxy-6-diphenoxyphosphinylmethyl-α-D-glucopyranoside, and
methyl 2,3,4-tri-O-benzyl-6-deoxy-6-diphenoxyphosphinylmethyl-α-D-mannopyranoside.

EXAMPLE 22

Other esters of 5-deoxy-5-dihydroxyphosphinylmethyl-D-furanosides and 6-deoxy-6-dihydroxyphosphinylmethyl-D-pyranosides Repeating the procedure of Example 9 but replacing methyl 5 - deoxy - 2,3 - O - isopropylidene - 5 - diphenoxyphosphinylmethyl-β-D-ribofuranoside with the product of Example 21 yields the corresponding dibenzyl, dimethyl, diethyl, diisopropyl, di(n-propyl), diallyl and di(p-methylbenzyl) esters of:

3-O-benzyl-5-deoxy-1,2-O-isopropylidene-5-dihydroxyphosphinylmethyl-α-D-xylofuranose,
methyl 2,3-di-O-benzyl-5-deoxy-5-dihydroxyphosphinylmethyl-D-lyxofuranoside,
methyl 2,3-di-O-benzyl-5-deoxy-5-dihydroxyphosphinylmethyl-α-D-arabinofuranoside,
methyl 3-O-benzyl-2,5-dideoxy-5-dihydroxyphosphinylmethyl-D-ribofuranoside,
methyl 2,3,4-tri-O-benzyl-6-deoxy-6-dihydroxyphosphinylmethyl-α-D-glucopyranoside, and
methyl 2,3,4-tri-O-benzyl-6-deoxy-6-dihydroxyphosphinylmethyl-α-D-mannopyranoside.

EXAMPLE 23

5 - deoxy - 5 - dihydroxyphosphinylmethyl - D - pentose and 6 - deoxy - 6 - dihydroxyphosphinylmethyl - D - hexose compounds A solution of 10 mmoles of 3 - O - benzyl - 5 - deoxy-1,2 - O - isopropylidene - 5 - dibenzyloxyphosphinylmethyl - α - D - xylofuranose in 100 ml. of methanol is added to a pre-reduced suspension of 3 g. of 10% palladium-on-charcoal in 100 ml. of methanol. The resulting mixture is stirred at room temperature under 1 atmosphere of hydrogen until the theoretical volume of hydrogen has been consumed. The catalyst is removed by filtration through diatomaceous earth; the combined filtrate and washings are evaporated to dryness to yield a white solid which is 5 - deoxy - 1,2 - O - isopropylidene-5 - dihydroxyphosphinylmethyl - α - D - xylofuranose. This material is dissolved in 25 ml. of 90% trifluoroacetic acid, and the solution is set aside at room temperature for 15 minutes. The reaction mixture is then evaporated to dryness in vacuo at a bath temperature of less than 50° C., and the residue is freed from traces of trifluoroacetic acid by repeated evaporation of ethanol. 5 - deoxy - 5 - dihydroxyphosphinylmethyl - D - xylose is obtained as an amorphous solid by the addition of ether. Alternatively, the free acid can be dissolved in minimum volume of water, 1.5 equivalents of barium acetate are then added, and the pH of this solution is brought to pH 8 by the addition of barium hydroxide solution. Two volumes of ethanol are then added to precipitate the barium salt of 5 - deoxy - 5 - dihydroxyphosphinylmethyl - D - xylofuranose.

Repeating this procedure with the other 5 - deoxy - 5 - dibenzyloxyphosphinylmethyl - D - furanoside and 6 - deoxy - 6 - dibenzyloxyphosphinylmethyl - D - pyranoside products of Example 22 yields the corresponding:

5-deoxy-5-dihydroxyphosphinylmethyl-D-lyxose,
5-deoxy-5-dihydroxyphosphinylmethyl-D-arabinose,
2,5-dideoxy-5-dihydroxyphosphinylmethyl-D-ribose,
6-deoxy-6-dihydroxyphosphinylmethyl-D-glucose, and
6-deoxy-6-dihydroxyphosphinylmethyl-D-mannose.

EXAMPLE 24

Calcium salts of monoesters of 5 - deoxy - 5 - dihydroxyphosphinylmethyl - D - furanoses and 6 - deoxy - 6 - dihydroxyphosphinylmethyl-D-pyronoses To a solution of 1 mmole of 3 - O - benzyl - 5 - deoxy-1,2, - O - isopropylidene - 5 - diphenoxyphosphinylmethyl-α - D - xylofuranose in 25 ml. of dioxane and 25 ml. of water is added 4 ml. of a 1 N aqueous solution of lithium hydroxide. The resulting solution is allowed to stand at 20° C. for 1 hour at which time the pH of the solution is adjusted to 7 by the addition of an acidic ion exchange resin. The resin is removed by filtration, and the filtrate is evaporated to dryness under reduced pressure to yield the lithium salt of 3 - O - benzyl - 5 - deoxy-1,2 - O - isopropylidene - 5 - (P - hydroxy - P - phenoxyphosphinylmethyl) - α - D - xylofuranose. This product, dissolved in a mixture of 5 ml. of water and 5 ml. of methanol, and is added to a pre-reduced suspension of 100 mg. of 10% palladium-on-charcoal catalyst in 10 ml. of methanol. The resulting mixture is stirred at room temperature under 1 atmosphere of hydrogen until the theoretical volume of hydrogen has been consumed. The catalyst is removed by filtration through diatomaceous earth and the combined filtrate and washings are evaporated to dryness to yield the lithium salt of 5 - deoxy-1,2 - O - isopropylidene - 5 - (P - hydroxy - P - phenoxyphosphinylmethyl) - α - D - xylofuranose. The acetonide protecting group of this product is removed by dissolving in 5 ml. of 90% trifluoroacetic acid, and the resulting solution is set aside at room temperature for about 15 minutes, at which time the reaction mixture is evaporated to dryness in vacuo at a bath temperature of less than 50° C., and the residue is freed from final traces of trifluoroacetic acid by repeated evaporation from ethanol to yield 5 - deoxy - 5 - (P - hydroxy - P - phenoxyphosphinylmethyl) - D - xylose, contaminated with lithium trifluoroacetate. The product is purified by dissolving it in ethanol, and treating the solution with 2 mmoles of triethylamine and 2 equivalents of calcium chloride solution in ethanol. The calcium salt of 5 - deoxy - 5 - (P-hydroxy - P - phenoxyphosphinylmethyl) - D - xylose precipitates from the solution, is removed by centrifugation, washed with ethanol and dried.

Repeating this procedure with the other diesters of 3 - O - benzyl - 5 - deoxy - 1,2 - O - isopropylidene - 5 - dihydroxyphosphinylmethyl - α - D - xylofuranose products of Example 22 yields the corresponding calcium salts of the benzyl, methyl, ethyl, isopropyl, n-propyl, allyl and p-methylbenzyl monoesters of 5 - deoxy - 5 - dihydroxyphosphinylmethyl-D-xylose.

Repeating this procedure with the other diesters produced in Examples 21 and 22 yields the corresponding calcium salts of the phenyl, benzyl, methyl, ethyl, isopropyl, n-propyl, allyl and p-methylbenzyl monoesters of 5-deoxy-5-dihydroxyphosphinylmethyl-D-lyxose,
5-deoxy-5-dihydroxyphosphinylmethyl-D-arabinose,
2,5-dideoxy-5-dihydroxyphosphinylmethyl-D-ribose,
6-deoxy-6-dihydroxyphosphinylmethyl-D-glucose, and
6-deoxy-6-dihydroxyphosphinylmethyl-D-mannose.

EXAMPLE 25

5 - deoxy - 5 - diphenoxyphosphinylmethyl - D - pentoses and 6 - deoxy - 6 - diphenoxyphosphinylmethyl - D - hexoses 3 - O - benzyl - 5 - deoxy - 1,2 - O - isopropylidene-5 - diphenoxyphosphinylmethyl - α - D - xylofuranose (10 mmoles) dissolved in 100 ml. of methanol is added to a pre-reduced suspension of 1 g. of 10% palladium on charcoal catalyst in 100 ml. of methanol. The resulting mixture stirred at room temperature under 1 atmosphere of hydrogen until the theoretical volume is hydrogen has been consumed. The catalyst is removed by filtration through diatomaceous earth, and the combined filtrate and washings are evaporated to dryness to yield 5 - deoxy - 1,2 - O - isopropylidene - 5 - diphenoxyphosphinylmethyy - α - D - xylofuranose. This compound is dissolved in 25 ml. of 90% trifluoroacetic acid, and the solution set aside at room temperature for 15 minutes. Evaporation of the reaction mixture to dryness under reduced pressure at a temperature of less than 50° C. followed by repeated re-evaporation of ethanol from the residue yields 5 - deoxy - 5 - diphenoxyphosphinylmethyl-D-xylose.

Repeating this procedure with the other products of Example 21 yields the corresponding:

5-deoxy-5-diphenoxyphosphinylmethyl-D-lyxose
5-deoxy-5-diphenoxyphosphinylmethyl-D-arabinose,
2,5-dideoxy-5-diphenoxyphosphinylmethyl-D-ribose,
6-deoxy-6-diphenoxyphosphinylmethyl-D-glucose, and
6-deoxy-6-diphenoxyphosphinylmethyl-D-mannose.

Repeating this procedure with the dimethyl, diethyl, diisopropyl and di(n-propyl) ester products of Example 22 yields the corresponding dimethyl, diethyl, diisopropyl and di-(n-propyl) esters of 5-deoxy-5-dihydroxyphosphinylmethyl-D-xylose,
5-deoxy-5-dihydroxyphosphinylmethyl-D-lyxose,
5-deoxy-5-dihydroxyphosphinylmethyl-D-arabinose,
2,5-dideoxy-5-dihydroxyphosphinylmethyl-D-ribose,
6-deoxy-6-dihydroxyphosphinylmethyl-D-glucose, and
6-deoxy-6-dihydroxyphosphinylmethyl-D-mannose.

EXAMPLE 26

Compounds having 1-O-acetyl groups

A solution of 1 mmole of 5-deoxy-5-diphenoxphosphinylmethyl-D-ribose in 20 ml. of pyridine is treated with 2 ml. of acetic anhydride, and the resulting mixture is stored at room temperature for 16 hours. Methanol (2 ml.) is added cautiously, with ice-cooling, and the reaction mixture is evaporated to dryness in vacuo at a bath temperature of 50° C. The residue is dissolved in methanol and re-evaporated to dryness (repeat several times) until a hard syrup is obtained. This syrup is partitioned between $H_2O$ and $CHCl_3$, the $CHCl_3$ extracts are dried over $MgSO_4$ and evaporated to give a residue which consists of an anomeric mixture of 1,2,3-tri-O-acetyl-5-deoxy-5-diphenoxyphosphinylmethyl-D-ribose.

Repeating this procedure with:

5-deoxy-5-diphenoxyphosphinylmethyl-D-xylose,
2,5-dideoxy-5-diphenoxyphosphinylmethyl-D-ribose,
6-deoxy-6-diphenoxyphosphinylmethyl-D-galactose, and
6-deoxy-6-diphenoxyphosphinylmethyl-D-glucose yields the corresponding anomeric mixture of the respective 1,2,3-tri - O-acetyl-5-deoxy-5-diphenoxyphosphinylmethyl-D-xylose,
1,3-di-O-acetyl - 2,5-dideoxy - 5 - diphenoxyphosphinylmethyl-D-ribose,
1,2,3,4 - tetra - O - acetyl-6-deoxy-6-diphenoxyphosphinylmethyl-D-galactose, and
1,2,3,4 - tetra - O - acetyl-6-deoxy-6-diphenoxyphosphinylmethyl-D-glucose.

A procedure suitable for compounds having the arabino, lyxo and manno configuration follows: Methyl 2,3-di-O-benzyl-5-deoxy - 5 - diphenoxyphosphinylmethyl-α-D-arabinoside (5 mmoles) is dissolved in a mixture of glacial acetic acid (50 ml.) and 6 N hydrochloric acid (7 ml.), and heated at 100° C. for one hour. The mixture is then poured on ice, and the crude precipitate is collected by filtration, dissolved in chloroform and washed with dilute sodium bicarbonate and then with water. The resulting crude 2,3-di - O - benzyl-5-diphenoxyphosphinylmethyl - D - arabinofuranose is dissolved in pyridine (10 ml.) containing acetic anhydride (2 ml.). After six hours the solution is poured on ice, and the resulting precipitate is dissolved in chloroform, extracted with dilute aqueous sodium bicarbonate and then with water. The resulting 1-O-acetyl-2,3-di - O - benzyl-5-deoxy - 5 - diphenoxyphosphinylmethyl - D - arabinofuranose is purified by chromatography on silicic acid.

Repeating the latter procedure but replacing methyl 2,3-di - O - benzyl-5-deoxy-5-diphenoxyphosphinylmethyl-α-D-arabinoside with methyl 2,3 - di-O-benzyl-5-deoxy-5-diphenoxyphosphinylmethyl-D-lyxofuranoside, and
methyl-2,3,4,-tri - O - benzyl - 6 - deoxy - 6 - diphenoxyphosphinylmethyl - D - mannopyranoside yields the corresponding 1 - O - acetyl - 2,3-di-O-benzyl-5-deoxy-5-diphenoxyphosphinylmethyl-D-lyxofuranose, and
1-O-acetyl - 2,3,4-tri - O - benzyl-6-deoxy-6-diphenoxyphosphinylmethyl-D-mannopyranose.

EXAMPLE 27

Glycosyl bromides

1 - O-acetyl-2,3-di-O-benzyl-5-deoxy-5-diphenoxyphosphinylmethyl-D-arabinofuranose (2 mmoles) is dissolved in a 32% solution of hydrogen bromide in glacial acetic acid together with 0.25 ml. of acetic anhydride. After two hours at room temperature the solution is evaporated to dryness in vacuo, and residual acid is carefully removed by repeated coevaporation with toluene to yield 2,3-di-O- benzyl - 5 - deoxy - 5 - diphenoxyphosphinylmethyl - D - arabinofuranosyl bromide.

Repeating this procedure with the other products of Example 26 yields the corresponding:

2,3-di - O - acetyl-5-deoxy-5-diphenoxyphosphinylmethyl-D-ribofuranosyl bromide,
2,3-di - O - acetyl-5-deoxy-5-diphenoxyphosphinylmethyl-D-xylofuranosyl bromide,
3-O-acetyl - 2,5-dideoxy - 5 - diphenoxyphosphinylmethyl-D-ribofuranosyl bromide,
2,3,4-tri - O - acetyl - 6 - deoxy-6-diphenoxyphosphinylmethyl-D-galactopyranosyl bromide,
2,3,4-tri - O - acetyl - 6-deoxy-6-diphenoxyphosphinylmethyl-D-glucopyranosyl bromide,
2,3-di-O-benzyl - 5 - deoxy-5-diphenoxyphosphinylmethyl-D-arabinofuranosyl bromide,
2,3-di - O - benzyl-5-deoxy-5-diphenoxyphosphinylmethyl-D-lyxofuranosyl bromide, and
2,3,4-tri - O - benzyl - 6 - deoxy-6-diphenoxyphosphinylmethyl-D-mannopyranosyl bromide.

EXAMPLE 28

Glycosyl chlorides 1,2,3 - tri - O - acetyl-5-deoxy-5-diphenoxyphosphinylmethyl-D-ribofuranose (2 mmoles) was dissolved in methylene chloride (25 ml.) and hydrogen chloride was bubbled through the solution at 0° C. for 15 minutes. The solution was stored at 0° C. for 24 hours and was repeatedly dissolved in toluene and evaporated in vacuo until residual hydrogen chloride was removed to yield crude 2,3 - di - O-acetyl-5-deoxy-5-diphenoxyphosphinylmethyl-D-ribofuranosyl chloride.

Repeating the above procedure with the products of Example 26 yields the corresponding:

2,3-di-O-acetyl-5-deoxy-5-diphenoxyphosphinylmethyl-D-xylofuranosyl chloride,
3-O-acetyl-2,5-dideoxy-5-diphenoxyphosphinylmethyl-D-ribofuranosyl chloride,
2,3,4-tri-O-acetyl-6-deoxy-6-diphenoxyphosphinylmethyl-D-galactopyranosyl chloride,
2,3,4-tri-O-acetyl-6-deoxy-6-diphenoxyphosphinylmethyl-D-glucopyranosyl chloride,
2,3-di-O-benzyl-5-deoxy-5-diphenoxyphosphinylmethyl-D-arabinofuranosyl chloride,
2,3-di-O-benzyl-5-deoxy-5-diphenoxyphosphinylmethyl-D-lyxofuranosyl chloride, and
2,3,4-tri-O-benzyl-6-deoxy-6-diphenoxyphosphinylmethyl-D-mannopyranosyl chloride.

We claim:
1. A compound selected from the group of compounds represented by the following formulas:

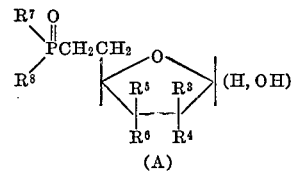
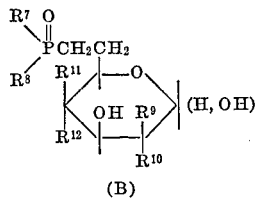

(A)    (B)

wherein:
$R^3$, $R^4$, $R^5$ and $R^6$ each are hydrogen or hydroxy but only as follows:
when $R^4$ and $R^6$ are hydroxy, and $R^3$ and $R^5$ are hydrogen;
when $R^4$ and $R^5$ are hydroxy, and $R^3$ and $R^6$ are hydrogen;
when $R^3$ and $R^5$ are hydroxy, and $R^4$ and $R^6$ are hydrogen;
when $R^3$ and $R^6$ are hydroxy, and $R^4$ and $R^5$ are hydrogen; and
when $R^6$ is hydroxy and $R^3$, $R^4$ and $R^5$ are hydrogen;

each of $R^7$ and $R^8$ are —OM, lower alkoxy, aryloxy having from 6 to 12 carbons, or halo, nitro, lower alkoxy or diloweralkylamino substituted aryloxy having from 6 to 12 carbons in the aryloxy group, and lower alkenylmethoxy having unsaturation at a position other than alpha, but not including benzyloxy or substituted benzyloxy, wherein M is hydrogen or a pharmaceutically acceptable cation;
$R^9$, $R^{10}$, $R^{11}$ and $R^{12}$ each are hydrogen or hydroxy but only as follows:
when $R^{10}$ and $R^{11}$ are hydroxy and $R^9$ and $R^{12}$ are hydrogen;
when $R^{10}$ and $R^{12}$ are hydroxy and $R^9$ and $R^{11}$ are hydrogen; and
when $R^9$ and $R^{12}$ are hydroxy and $R^{10}$ and $R^{11}$ are hydrogen.

2. As a compound of claim 1, a compound selected from the group of compounds represented by Formula A.

3. As compounds of claim 2, 5-deoxy-5-diphenoxyphosphinylmethyl-D-ribose and its pharmaceutically acceptable salts.

4. As compounds of claim 2, 5-deoxy-5-diphenoxyphosphinylmethyl-D-xylose and its pharmaceutically acceptable salts.

5. As compounds of claim 2, 5-deoxy-5-diphenoxyphosphinylmethyl-D-lyxose and its pharmaceutically acceptable salts.

6. As compounds of claim 2, 5-deoxy-5-diphenoxyphosphinylmethyl-D-arabinose and its pharmaceutically acceptable salts.

7. As compounds of claim 2, 2,5-dideoxy-5-diphenoxyphosphinylmethyl-D-ribose and its pharmaceutically acceptable salts.

8. As a compound of claim 1, a compound selected from the group of compounds represented by Formula B.

9. As compounds of claim 8, 6-deoxy-6-diphenoxyphosphinylmethyl-D-glucose and its pharmaceutically acceptable salts.

10. As compounds of claim 8, 6-deoxy-6-diphenoxyphosphinylmethyl-D-mannose and its pharmaceutically acceptable salts.

11. As compounds of claim 8, 6-deoxy-6-diphenoxyphosphinylmethyl-D-galactose and its pharmaceutically acceptable salts.

12. A compound selected from the group of compounds represented by the following formulas:

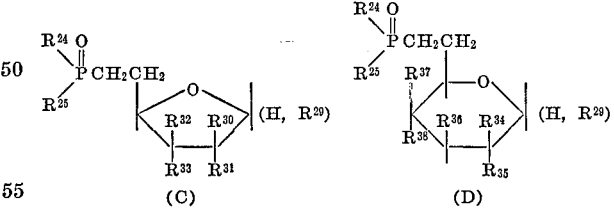

(C)    (D)

wherein:
$R^{24}$ and $R^{25}$ are lower alkoxy, lower alkenylmethoxy but not including α-unsaturated alkenylmethoxy, or aryloxy having from 6 to 12 carbons, or halo, nitro, lower alkoxy or diloweralkylamino substituted aryloxy having from 6 to 12 carbons in the aryloxy groups, but not including benzyloxy or substituted benzyloxy;
$R^{29}$ is bromo, chloro or lower aliphatic acyloxy;
$R^{30}$ and $R^{34}$ each are hydrogen, benzyloxy or substituted benzyloxy;
$R^{31}$, $R^{35}$ and $R^{37}$ each are hydrogen or lower aliphatic acyloxy; $R^{32}$, $R^{33}$ and $R^{38}$ each are hydrogen, benzyloxy, substituted benzyloxy or lower aliphatic acyloxy; and
$R^{36}$ is benzyloxy, substituted benzyloxy or lower aliphatic acyloxy but only as follows:
when $R^{31}$ and $R^{33}$ are lower aliphatic acyloxy, and $R^{30}$ and $R^{32}$ are hydrogen;

when $R^{31}$ and $R^{32}$ are lower aliphatic acyloxy, and $R^{30}$ and $R^{33}$ are hydrogen;

when $R^{30}$ and $R^{32}$ are benzyloxy or substituted benzyloxy, and $R^{31}$ and $R^{33}$ are hydrogen;

when $R^{30}$ and $R^{33}$ are benzyloxy or substituted benzyloxy, and $R^{31}$ and $R^{32}$ are hydrogen;

when $R^{35}$, $R^{36}$ and $R^{37}$ are lower aliphatic acyloxy, and $R^{34}$ and $R^{38}$ are hydrogen;

when $R^{33}$ is benzyloxy, substituted benzyloxy or lower aliphatic acyloxy, and $R^{30}$, $R^{31}$ and $R^{32}$ are hydrogen;

when $R^{35}$ and $R^{36}$ and $R^{38}$ are lower aliphatic acyloxy, and $R^{34}$ and $R^{37}$ are hydrogen; and when $R^{34}$, $R^{36}$ and $R^{38}$ are benzyloxy or substituted benzyloxy, and $R^{35}$ and $R^{37}$ are hydrogen.

13. As a compound of claim 12, a compound selected from the group of compounds represented by Formula C.

14. As a compound of claim 12, a compound selected from the group of compounds represented by Formula D.

References Cited

UNITED STATES PATENTS 3,066,135  11/1962  Baruchello _____ 260—234
3,238,191  3/1966   Myers _____ 260—211.5

LEWIS GOTTS, Primary Examiner

J. R. BROWN, Assistant Examiner

U.S. Cl. X.R.

260—210, 211.5, 999

UNITED STATES PATENT OFFICE
CERTIFICATE OF CORRECTION

Patent No. 3,583,974                                    Dated June 8, 1971

Inventor(s)   Gordon H. Jones and John G. Moffatt

It is certified that error appears in the above-identified patent and that said Letters Patent are hereby corrected as shown below:

Column 6, lines 48-54, that portion of the Formula (IX) reading "  " should be as shown.

Signed and sealed this 18th day of July 1972.

(SEAL)
Attest:

EDWARD M. FLETCHER, JR.              ROBERT GOTTSCHALK
Attesting Officer                     Commissioner of Patents